United States Patent
Mena-Dominguez et al.

(10) Patent No.: US 10,753,231 B2
(45) Date of Patent: Aug. 25, 2020

(54) SELF-RETAINING BUSHING ASSEMBLY

(71) Applicant: General Electric Company, Schenectady, NY (US)

(72) Inventors: Rodolfo Mena-Dominguez, Santiago de Queretaro (MX); Ehecatl Tonatiuh Astorga Triay, Santiago de Queretaro (MX)

(73) Assignee: General Electric Company, Schenectady, NY (US)

( * ) Notice: Subject to any disclaimer, the term of this patent is extended or adjusted under 35 U.S.C. 154(b) by 1003 days.

(21) Appl. No.: 15/177,814

(22) Filed: Jun. 9, 2016

(65) Prior Publication Data
US 2017/0356305 A1   Dec. 14, 2017

(51) Int. Cl.
| | |
|---|---|
| *F01D 25/16* | (2006.01) |
| *F01D 9/04* | (2006.01) |
| *F01D 17/14* | (2006.01) |
| *F16C 33/20* | (2006.01) |
| *F16C 31/02* | (2006.01) |
| *F01D 17/16* | (2006.01) |

(52) U.S. Cl.
CPC ........... *F01D 25/162* (2013.01); *F01D 9/041* (2013.01); *F01D 17/14* (2013.01); *F01D 17/162* (2013.01); *F16C 31/02* (2013.01); *F16C 33/20* (2013.01); *F05D 2220/32* (2013.01); *F05D 2260/50* (2013.01); *F05D 2300/10* (2013.01); *F05D 2300/43* (2013.01); *F16C 2360/23* (2013.01)

(58) Field of Classification Search
CPC ...................................................... F04D 9/041
See application file for complete search history.

(56) References Cited

U.S. PATENT DOCUMENTS

| | | | | |
|---|---|---|---|---|
| 3,325,087 | A * | 6/1967 | Davis | F01D 17/162 415/209.3 |
| 4,363,580 | A | 12/1982 | Bell | |
| 4,887,331 | A | 12/1989 | Thomas | |
| 5,308,226 | A * | 5/1994 | Venkatasubbu | F01D 17/162 415/160 |
| 5,421,703 | A | 6/1995 | Payling | |
| 6,729,765 | B2 | 5/2004 | Ni et al. | |
| 6,769,868 | B2 | 8/2004 | Harrold | |
| 7,278,819 | B2 * | 10/2007 | Schilling | F01D 17/162 415/147 |
| 7,413,401 | B2 * | 8/2008 | Szucs | F01D 17/162 415/160 |

(Continued)

*Primary Examiner* — Woody A Lee, Jr.
*Assistant Examiner* — Michael L Sehn
(74) *Attorney, Agent, or Firm* — Hanley, Flight and Zimmerman, LLC

(57) ABSTRACT

A bushing apparatus includes: a housing with first and second ends, the housing having an outer bore passing therethrough from the first end to the second end, wherein the bore includes a reduced-diameter band located between the first and second ends; and a bushing received in the outer bore, the bushing having first and second ends and an inner bore passing therethrough from the first end to the second end of the bushing, wherein the bushing includes an outer surface having a reduced-diameter groove located between the first and second ends, wherein the band is received in the groove in a radially overlapping relationship, so as to block movement of the bushing relative to the housing.

17 Claims, 3 Drawing Sheets

(56) References Cited

U.S. PATENT DOCUMENTS

| | | | |
|---|---|---|---|
| 2003/0091251 A1* | 5/2003 | Ni | F16C 33/08 |
| | | | 384/295 |
| 2013/0039736 A1* | 2/2013 | Waugh | F01D 17/162 |
| | | | 415/1 |

* cited by examiner

SELF-RETAINING BUSHING ASSEMBLY

BACKGROUND OF THE INVENTION

This invention relates generally to gas turbine engines and more particularly to components for actuation of variable stator vanes in the compressor of such engines.

A gas turbine engine includes a compressor used to pressurize intake air which then flows to a downstream combustor and one or more turbines. A typical compressor includes a series of stages, each stage including a row of stationary stator vanes and a row of rotating compressor blades.

In some gas turbine engines, one or more stages of the stator vanes are variably actuated. An outer trunnion or spindle of each vane passes through the stator case and is coupled to a lever arm. A distal end of each lever arm is joined to an actuation ring through a pin that engages a hole in the actuation ring. The actuation ring is in turn connected to a vane actuator.

In a prior art bushing design, a generally cylindrical bushing is inserted into a circular bore from an outboard position in a radially inward direction. The bushing has a flange at its outer end which locates against the housing and prevents the bushing from moving further radially inboard. The inner end of the bushing has a "barbed" configuration. The inboard end of the bore has a counterbore which forms a retention shoulder. Upon insertion, the barbed end passes by the retention shoulder, thus preventing extraction of the bushing in a radially outward direction.

One problem with this design is that in operation, cracks can form between the flange and the bushing, causing the flange to separate. This would allow the bushing to drop radially inward and no longer be properly located. This condition can result in improper operation or damage to the components.

BRIEF SUMMARY OF THE INVENTION

This problem is addressed by the concept described herein, which provides a bushing which is configured to be self-retained in a bore.

According to one aspect of the technology described herein, a bushing apparatus includes: a housing with first and second ends, the housing having an outer bore passing therethrough from the first end to the second end, wherein the bore includes a reduced-diameter band located between the first and second ends; and a bushing received in the outer bore, the bushing having first and second ends and an inner bore passing therethrough from the first end to the second end of the bushing, wherein the bushing includes an outer surface having a reduced-diameter groove located between the first and second ends, wherein the band is received in the groove in a radially overlapping relationship, so as to block movement of the bushing relative to the housing.

According to another aspect of the technology described herein, a variable stator vane apparatus for a gas turbine engine includes: a plurality of stator vanes disposed in an array about a central axis, each stator vane mounted for rotation about a trunnion axis; a lever coupled to each stator vane; an actuation ring having inboard and outboard surfaces and including a plurality of outer bores, each outer bore passing through the actuation ring from the inboard end to the outboard surface, wherein each outer bore includes a reduced-diameter band located between the inboard and outboard surfaces; a bushing received in each of the outer bores, each bushing having inboard and outboard surfaces and an inner bore passing therethrough from the inboard surface to the outboard surface of the bushing, wherein the bushing includes an outer surface having a reduced-diameter groove located between the inboard and outboard surfaces, wherein the band is received in the groove in a radially overlapping relationship, so as to block movement of the bushing relative to the housing; and a pin received in each inner bore, each of the pins connected to a distal end of one of the levers.

BRIEF DESCRIPTION OF THE DRAWINGS

The invention may be best understood by reference to the following description taken in conjunction with the accompanying drawing figures, in which.

DETAILED DESCRIPTION OF THE INVENTION

Figure 1:
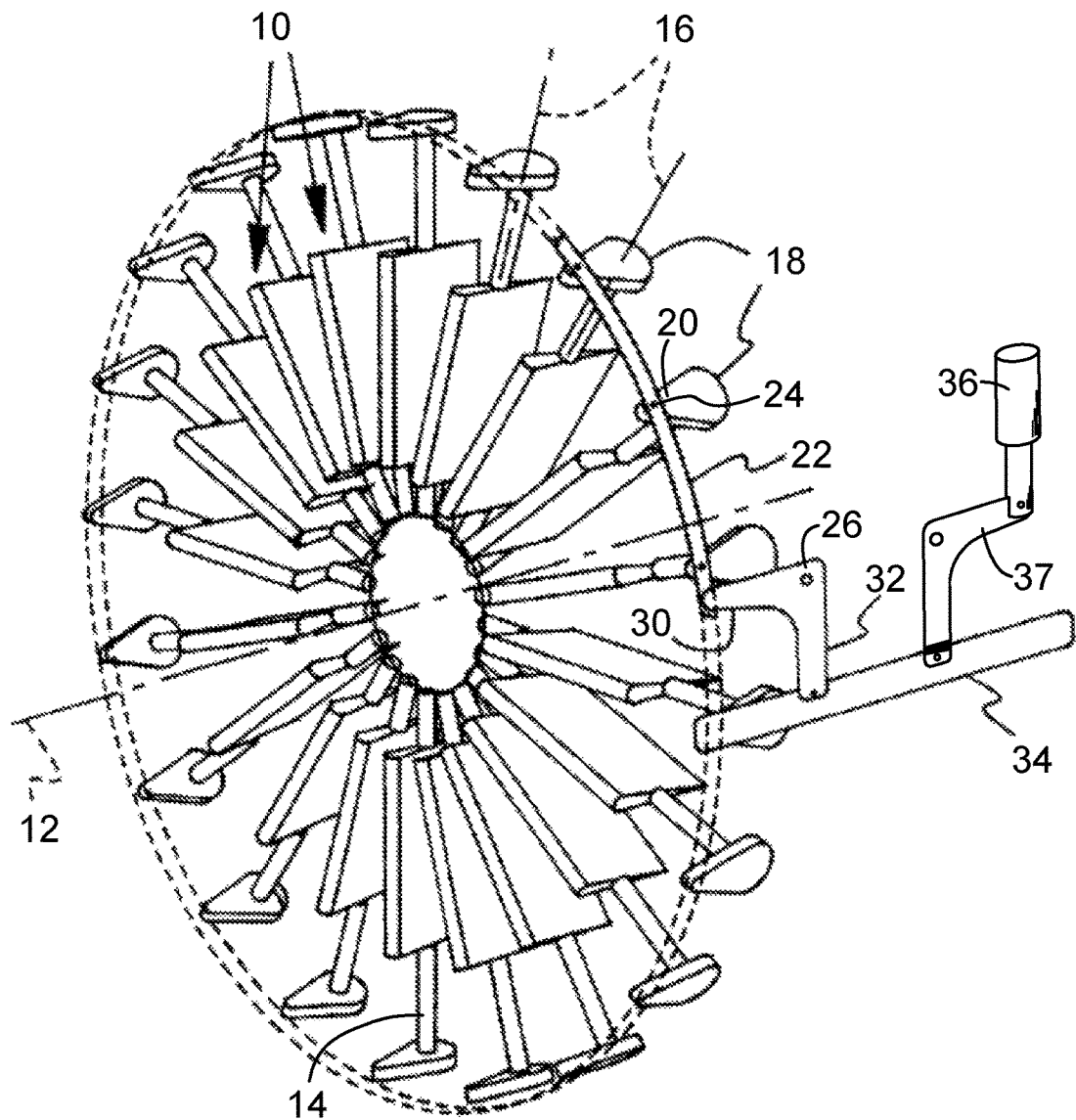
FIG. 1 is a schematic perspective view of a variable stator vane apparatus including an actuation ring.
Figure 2:
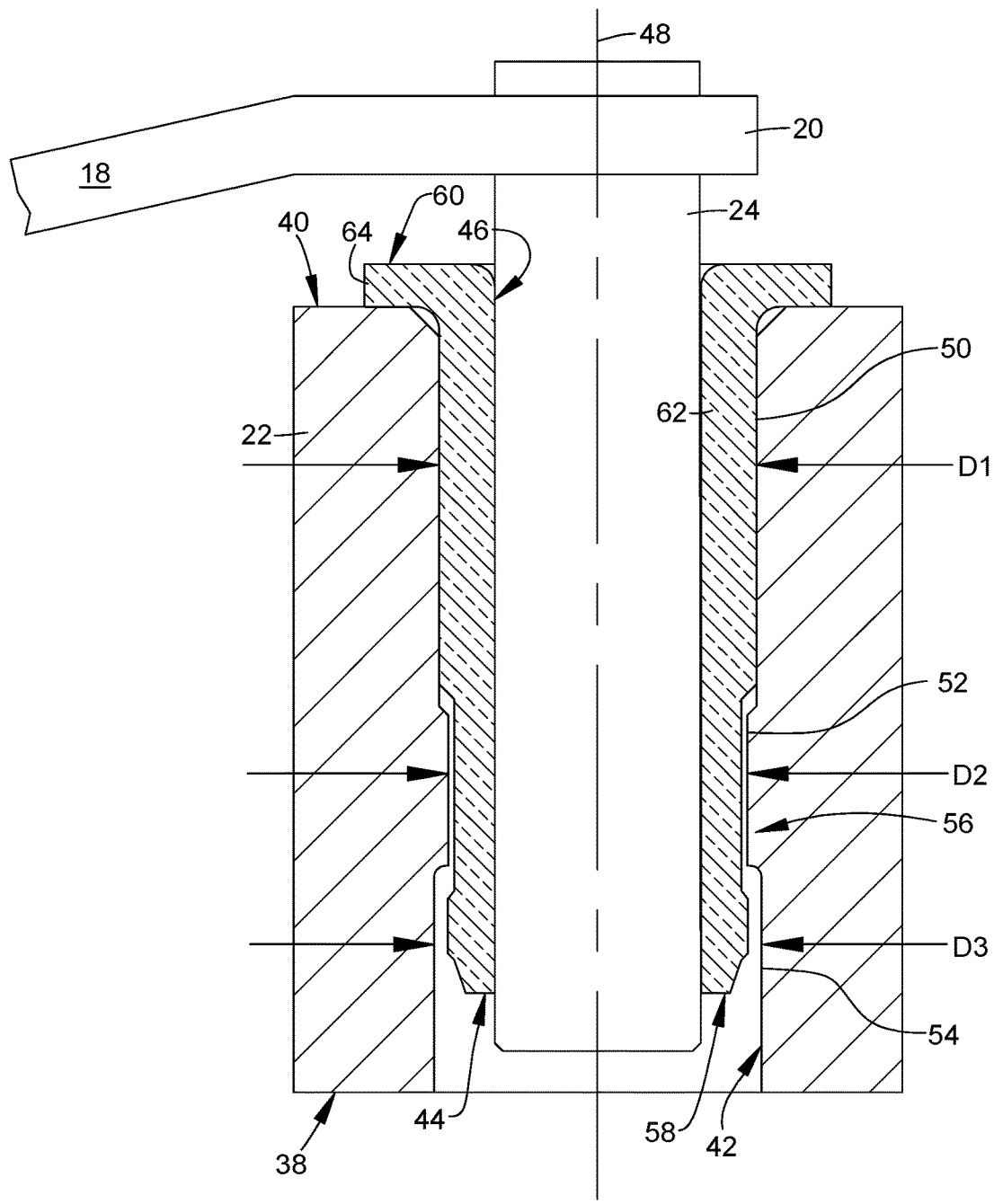
FIG. 2 is a schematic cross-sectional view of a variable stator vane lever assembled to an actuation ring.

Referring to the drawings wherein identical reference numerals denote the same elements throughout the various views, FIGS. 1 and 2 illustrate an exemplary array of stator vanes 10 as would be used in the compressor section of a gas turbine engine (not shown). The stator vanes 10 are disposed in a radial array around a central axis 12 which is coincident with a longitudinal centerline axis of the engine.

It is noted that, as used herein, the term "axial" or "longitudinal" refers to a direction parallel to the central axis 12, while "radial" refers to a direction perpendicular to the axial direction, and "tangential" or "circumferential" refers to a direction mutually perpendicular to the axial and tangential directions. These directional terms are used merely for convenience in description and do not require a particular orientation of the structures described thereby Each airfoil-shaped stator vane 10 includes a trunnion 14 which is mounted in a stationary casing (not shown) such that the stator vane can rotate or pivot about a trunnion axis 16 extending perpendicular to the central axis 12. A lever 18 is rigidly mounted to each trunnion 14. A distal end 20 of each lever is connected to an actuation ring 22 which encircles the array of stator vanes 10. Each distal end 20 is coupled to the actuation ring 22 using a pin 24 received in a bushing as described in more detail below.

A bellcrank 26 includes a first arm 30 connected to the actuation ring 22, and a second arm 32 pivotally connected to a link 34 which is in turn connected to an actuator 36 of a known type, for example through a second bellcrank 37. The movable components are arranged such that movement of the actuator 36 will cause rotation of the actuation ring 22 about the central axis 12, in turn causing rotation of the levers 18 and connected stator vanes 10 in unison. It will be understood that the components illustrated in FIG. 1 represent a single stage of movable airfoils, and that a gas turbine engine may include multiple stages of such movable airfoils, all of which may be operated by the same actuator 36.

FIG. 2 illustrates the connection of one of the levers 18 to the actuation ring 22 in more detail. The actuation ring 22 has inboard and outboard surfaces 38 and 40, respectively and an outer bore 42 which receives a bushing 44 that in turn defines an inner bore 46. As noted above, the distal end 20 of the lever 18 includes the cylindrical pin 24 which extends through the inner bore 46. The inner bore 46 passes through the bushing 44 and is sized to receive the pin 24 with a selected fit as required for a particular application, for example a tight clearance. The selected fit is not of concern relative to the present invention. The bushing 44 serves to locate the pin 24 and transfer mechanical loads between the actuation ring 22 in the lever 18, while permitting the pin 24 to rotate relative to the actuation ring 22 about a radial pin axis 48.

The actuation ring 22 is made from a rigid material such as a metal alloy. For example, it may be made from an aerospace steel alloy such as A286.

The outer bore 42 has first, second, and third sections, labeled 50, 52, and 54, respectively in sequence from the outboard surface 40 to the inboard surface 38. Each of the bore sections 50, 52, and 54 is generally cylindrical and define diameters D1, D2, and D3, respectively.

Diameter D1 is greater than or equal to diameter D3, which in turn is greater than diameter D2. Stated another way, diameter D2 is a small diameter located intermediate the inboard and outboard surfaces 38 and 40, and there are long counterbores on either end of diameter D2. Stated another way, there is an outer bore 42 through the actuation ring 22, and a diameter which represents a reduced diameter band 56 is located in a middle portion of the outer bore 42.

Figure 3:
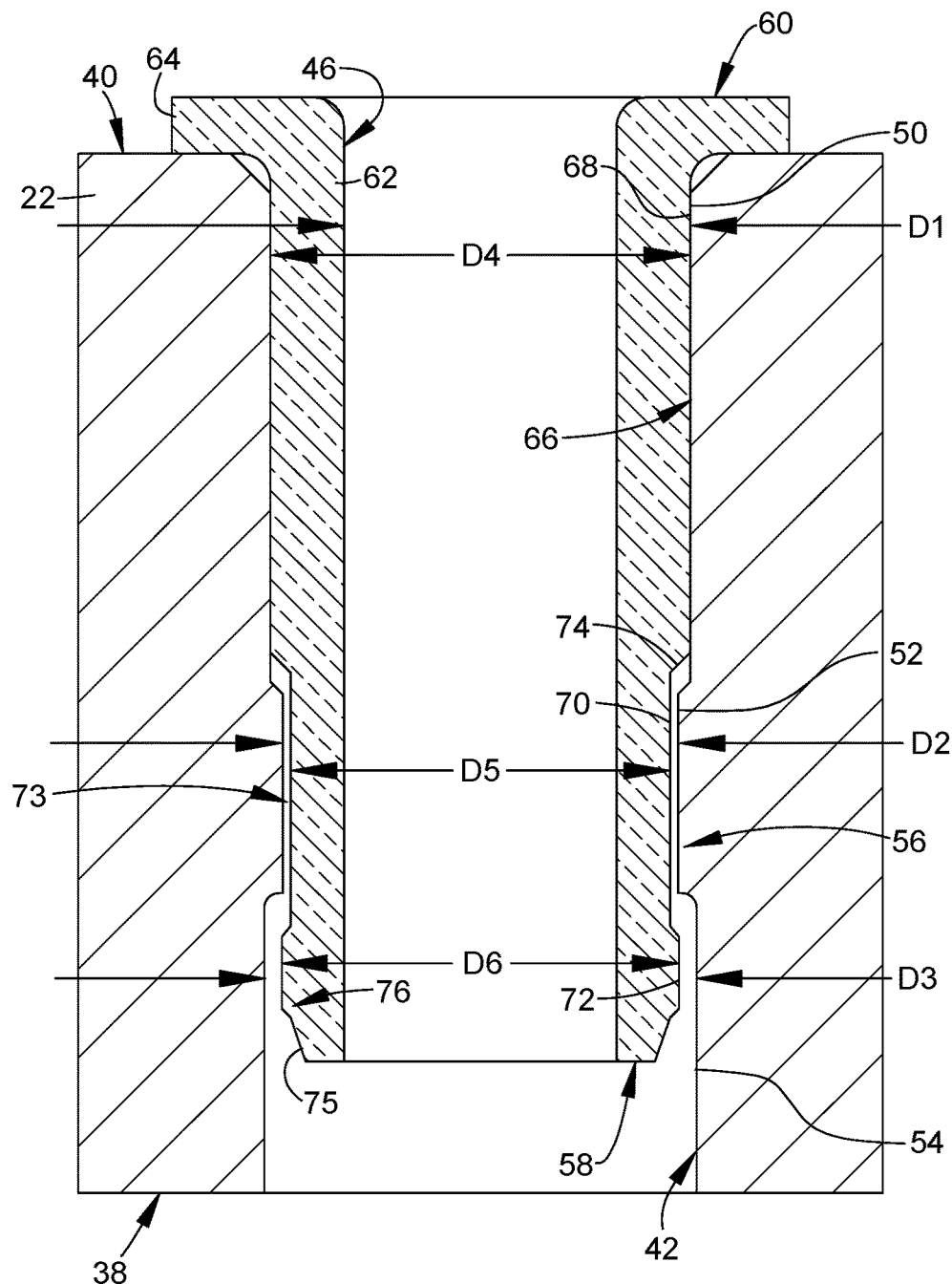
FIG. 3 is a schematic cross-sectional view of a variable stator vane actuation ring having a bushing assembled thereto.

Referring now to FIG. 3, the bushing 44 has inboard and outboard surfaces 58, and 60, respectively, and comprises a generally cylindrical body 62 with an annular, radially-extending flange 64 adjacent to the outboard surface 60.

The body 62 includes an annular outer surface 66 comprised of first, second, and third sections, labeled 68, 70, and 72, respectively in sequence from the outboard surface 60 to the inboard surface 58. Each of the sections 68, 70, and 72 is generally cylindrical and define diameters D4, D5, and D6, respectively.

When inserted into the outer bore 42, the bushing 44 is positioned such that the first section 68 of the outer surface 66 lies adjacent the first section 50 of the outer bore 42, the second section 70 of the outer surface 66 lies adjacent the second section 52 of the outer bore 42, and the third section 72 of the outer surface 66 lies adjacent the third section 54 of the outer bore 42.

Each of the first, second, and third sections 68, 70, 72 of the outer surface 66 may be sized relative to the corresponding first, second, and third sections 50, 52, 54 of the outer bore 42 so as to have a selected fit as required for a particular application. The selected fit could comprise either a radial clearance or a radial interference and is not of concern relative to the present invention.

The first section 68 and the second section 70 of the outer surface 66 are sized so as to define a shoulder 74 at the intersection of the two surfaces 68 and 70. Stated another way, the second diameter D5 of the outer surface 66 is smaller than the first diameter D4 of the outer surface 66. The first diameter D4 of the outer surface 66 is also larger than the second diameter D2 of the outer bore 42.

The third diameter D6 of the outer surface 66 is larger than the second diameter D5 of the outer surface 66, and may be equal to or less than the first diameter D4 of the outer surface 66. The third diameter D6 of the outer surface 66 is also larger than the second diameter D2 of the outer bore 42. Stated another way, the outer 66 includes a reduced diameter groove 73 disposed between its inboard and outboard surfaces 58 and 60.

A chamfer 75 may be formed at the inboard surface 58. In cooperation with the third surface section 72 it defines an annular "barb" 76.

The bushing 44 may be made any material having adequate mechanical and thermal properties for the intended operation. For example it may be configured to be sacrificial relative to other components and/or self-lubricating. One nonlimiting example of a suitable material is an aviation grade polymer, such as high temperature polyimide with additives for strength and friction.

The bushing 44 may be assembled to the actuation ring 22 by pressing it in to the outer bore 42 in a radially inward direction. During assembly, the chamfer 75 pilots the barb 76 and permits the barb 76 to compress it so that it can pass by the band 56. After it passes the band 56, it expands back to nominal size. When assembled, the barb 76 is in a radially overlapping relationship with the band 56 of the outer bore 42, preventing radially outboard movement of the bushing 44.

When assembled, the shoulder 74 is in a radially overlapping relationship with the band 56 of the outer bore 42. The result is that even if the flange 64 were to become separated from the body 62, the shoulder 74 would engage the band 56 so as to block radially inward movement of the bushing 44 relative to the actuation ring 22. This may also be described as the band 56 being received in the groove 73 in a radially overlapping relationship so as to block movement of the bushing 44 relative to the actuation ring 22. The bushing 44 may thus be described as "self-retaining" in the outer bore 42.

The bushing 44 described herein has several advantages over the prior art. It prevents the bushing 44 from falling radially inward if the flange 64 becomes separated, thus maintaining the function of the related parts and preventing damage. Furthermore, the design can be manufactured at low cost because there are no undercuts required to form the various diameters.

It will be understood that the outer bore 42 and bushing 44 described above could be constructed in an orientation inverted relative to the example described above, with the flange 64 against the inboard surface 38 of the actuation ring 22. Furthermore, while the concept has been described in the context of a pin bushing and an actuation ring, it will be understood that the same concept could be used to provide retention for any bushing received in a housing.

The foregoing has described a bushing assembly. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A bushing apparatus, comprising:
   a housing with first and second ends, the housing having an outer bore passing therethrough from the first end to the second end, wherein the bore includes a reduced-diameter band located between the first and second ends; and
   a bushing received in the outer bore, the bushing having first and second ends and an inner bore passing therethrough from the first end to the second end of the bushing, wherein the bushing includes an outer surface having a reduced-diameter groove located between the first and second ends, wherein the band is received in the groove in a radially overlapping relationship, so as to block movement of the bushing relative to the housing.

2. The apparatus of claim 1 wherein the bushing includes a body defining the outer surface and an annular, radially-extending flange disposed at the first end, the flange abutting the first end of the housing.

3. The apparatus of claim 1 wherein:
   the outer bore includes in sequence from the first end to the second end: first, second, and third sections, having corresponding first, second, and third diameters, and wherein the second diameter is smaller than both the first and third diameters.

4. The apparatus of claim 1 wherein the outer surface of the bushing includes sequence from the first end to the second end: first, second, and third sections, having corresponding first, second, and third diameters, and wherein the first and second diameters cooperate to define a shoulder.

5. The apparatus of claim 4 wherein the bushing includes a chamfer at the first end, and the chamfer cooperates with the third section to define an annular barb.

6. The apparatus of claim 1 wherein the outer surface of the bushing includes in sequence from the first end to the second end: first, second, and third sections, having corresponding first, second, and third diameters, and wherein the first and third diameters are greater than the second diameter.

7. The apparatus of claim 6 wherein the first and third diameters are equal to each other.

8. The apparatus of claim 1 wherein the bushing comprises a polymer and the housing comprises a metal.

9. The apparatus of claim 1 wherein the housing comprises an annular actuation ring.

10. A variable stator vane apparatus for a gas turbine engine, comprising:
    a plurality of stator vanes disposed in an array about a central axis, each stator vane mounted for rotation about a trunnion axis;
    a lever coupled to each stator vane;
    an actuation ring having inboard and outboard surfaces and including a plurality of outer bores, each outer bore passing through the actuation ring from the inboard surface to the outboard surface, wherein each outer bore includes a reduced-diameter band located between the inboard and outboard surfaces;
    a bushing received in each of the outer bores, each bushing having inboard and outboard surfaces and an inner bore passing therethrough from the inboard surface to the outboard surface of the bushing, wherein the bushing includes an outer surface having a reduced-diameter groove located between the inboard and outboard surfaces, wherein the band is received in the groove in a radially overlapping relationship, so as to block movement of the bushing relative to the actuation ring; and
    a pin received in each inner bore, each of the pins connected to a distal end of one of the levers.

11. The apparatus of claim 10 wherein each bushing includes a body defining the outer surface and an annular, radially-extending flange disposed at the outboard surface, the flange abutting the outboard surface of the actuation ring.

12. The apparatus of claim 10 wherein:
    each of the outer bores includes in sequence from the outboard surface to the inboard surface:
    first, second, and third sections, having corresponding first, second, and third diameters, and wherein the second diameter is smaller than both the first and third diameters.

13. The apparatus of claim 10 wherein the outer surface of each bushing includes in sequence from the outboard surface to the inboard surface: first, second, and third sections, having corresponding first, second, and third diameters, and wherein the first and second diameters cooperate to define a shoulder.

14. The apparatus of claim 13 wherein each bushing includes a chamfer on the outer surface, at the inboard surface, and the chamfer cooperates with the third section to define an annular barb on the outer surface.

15. The apparatus of claim 10 wherein the outer surface of each bushing includes in sequence from the outboard surface to the inboard surface: first, second, and third sections, having corresponding first, second, and third diameters, and wherein the first and third diameters are greater than the second diameter.

16. The apparatus of claim 15 wherein the first and third diameters are equal to each other.

17. The apparatus of claim 10 wherein each bushing comprises a polymer and the actuation ring comprises a metal.

* * * * *